US007284412B1

(12) United States Patent
Perrault

(10) Patent No.: US 7,284,412 B1
(45) Date of Patent: Oct. 23, 2007

(54) MOISTURE DETECTION APPARATUS

(76) Inventor: Robert T. Perrault, 22010 Creek Rd., Gulf Shores, AL (US) 36542

( * ) Notice: Subject to any disclaimer, the term of this patent is extended or adjusted under 35 U.S.C. 154(b) by 0 days.

(21) Appl. No.: 11/484,928

(22) Filed: Jul. 12, 2006

(51) Int. Cl.
  *G01M 3/00* (2006.01)
(52) U.S. Cl. .................. 73/40; 73/29.04; 73/29.05; 116/211
(58) Field of Classification Search ........... 73/29.01, 73/335.02, 335.11, 29.04, 29.05, 40, 40.7; 116/211
See application file for complete search history.

(56) References Cited

U.S. PATENT DOCUMENTS 2,951,764 A * 9/1960 Chase .................. 426/88
3,246,758 A * 4/1966 Wagner ................ 210/94
2004/0211315 A1* 10/2004 Kretsinger et al. ......... 95/117

* cited by examiner

*Primary Examiner*—Hezron Williams
*Assistant Examiner*—David A Rogers
(74) *Attorney, Agent, or Firm*—Peter Loffler

(57) ABSTRACT

A moisture detection apparatus is installed within a building below a critical area of the building's envelope and has a casing, which may be telescoping, and which as a window on one or both ends. An absorbent material is disposed within an interior chamber of the casing as is a moisture soluble dye that changes color upon contact with moisture and thereby changes the color of the absorbent material which color change is visible through the windows, the moisture entering the interior chamber through at least one upwardly oriented aperture on the casing. The apparatus is installed so that the window protrudes either through an interior wall section of the building's exterior wall, an exterior wall section of the wall, or both. If water penetrates the building, the water enters the casing, and causes the dye to change the color of the absorbent material to alert an occupant that a cladding failure has occurred.

6 Claims, 3 Drawing Sheets

MOISTURE DETECTION APPARATUS

BACKGROUND OF THE INVENTION

1. Field of the Invention

The present invention relates to a moisture indication device that is permanently affixed to a building in order to detect and alert to the presence of moisture penetration through the building's exterior envelope.

2. Background of the Prior Art

Stucco systems and the closely related EIFS (Exterior Insulation and Finish Systems) are very popular exterior cladding systems that tend to be found on higher end homes. These beautiful systems give a building a warm and inviting feel and are very beautiful, however, they are not without problems. Stucco and similar systems (the term "stucco" being used broadly hereinafter to include such similar systems) are very durable claddings. Standing alone, in that a portion of a building that is purely stucco (a flat wall for example), the system will tend to have an extremely low rate of failure even in the harshest of conditions. The problem with such finishing systems lies at boundary areas such as doors, windows, laundry vents, etc., where two and more often three different types of materials arrive at the same proximity. If the stucco system is sealed properly and according to the particular manufacturer's specifications, problems with the stucco tend to be low. However, as anyone who has ever witnessed a building construction site, proper sealing of stucco (or any other building component for that matter) is not always the case. If the stucco is not sealed properly, then water may penetrate into the building past the stucco system, especially over time as the various materials expand and contract at different rates with the changes in temperature. Although modern silicone sealants are used at stucco transition points where stucco meets doors, windows, etc., which sealants are very durable and long-lasting, a bad sealing job can easily trump even the best sealants available, and even the best sealants can fail over time even if properly installed.

Water penetration into the exterior of the building can be very damaging especially if the damaging effects are allowed to percolate. The water can be absorbed by the wall insulation which is in "dead space" within the exterior walls and therefore the insulation tends to hold the water. As the insulation is in contact with the lumber used to construct the wall, the lumber begins to decay, resulting in wood rot. As most building exterior envelope failures tend to occur about doors and windows, there is a strong possibility that the wood rot is occurring on a load bearing component of the building. If sufficient time passes without the wood rot being corrected, structural failure of a portion of the building can occur. Additionally, the water within the relatively warm interior space of the building tends to incubate mold, which mold can be extremely dangerous to the health of occupants of the building especially those with breathing difficulties or compromised immune systems. Remediation of mold infestation within a building can be a daunting task. Furthermore, the water also attacks the cladding itself causing failure from the inside out.

One problematic aspect of water penetration is that it is generally not observed by the building's occupants until serious damage has occurred. It is not uncommon to have a building owner first discover that water penetration problems exist during a routine building inspection as part of the sale of the building. It is also not uncommon to have a remediation tab of $10,000.00, $20,000.00, or even much higher. And as an added insult, many insurance policies are trending away from coverage of any mold or other fungal damage.

Although stucco systems are prone to failure from improper sealing, other types of exterior finishing systems may also fail with the attendant problems associated with such failure.

One basic method to combat stucco failure is to have a quality stucco person perform the installation and/or have the job inspected. However, it is usually the builder who selects the subs to work on the building and builders oftentimes are motivated first by profit. As long as the building can withstand the one year builder's warranty which most builder's give (or are required to give), the builder is home free. Generally, only the most egregious envelope failures are detected in the first year of a building's life, therefore, many builders opt for the lowest bid (and highest profit to the builder) sub with quality being simply a variable. Most general building inspectors will catch obvious stucco problems but detailed analysis of the building's envelope tends to be outside of the scope of such inspections.

Another method to combat stucco seal failure is to have a specialized inspection of the building's envelope performed periodically, preferably yearly. Such specialized inspections involve an analysis of all critical points of the stucco finish either by inserting a moisture detection probe into the wall of the building from the exterior of the building, or more recently, using non-invasive infrared moisture detection systems to "see" into the walls for possible moisture presence. By being performed yearly, any failure that occurs can be caught and remedied relatively quickly and relatively inexpensively. Such inspections have the effect of reducing the damage caused by envelope failures, although a penetration that lasts for six months can still do substantial damage. Additionally, such inspections can be quite expensive.

Another method employed is to install moisture detection systems directly into the building, usually during original construction of the building. Typically such systems work by providing an open electrical circuit within the detection device and should water penetrate the envelope and come in contact with the device, the water closes the electrical circuit thereby activating some form of alarm to alert the building's owner or occupant that a cladding failure has occurred. These systems, which work with varying degrees of efficiency, tend to be very expensive to install and are extremely difficult to install in existing structures. Some standalone mechanical devices have been proposed that are much easier to install into existing buildings, however, such devices tend to be complex in design and construction making such devices relatively expensive to manufacture.

Accordingly, there exists a need in the art for a device that detects failure of a building's exterior cladding that results in water penetration past the failure point so that immediate corrective action can be taken so as to minimize the damage caused by the water penetration. Such a device must be relatively simple in design and construction so that it is readily affordable to a typical building owner that may have to purchase several dozen such devices to fully monitor a building. Such a device must be installable during building construction as well as after the building is complete.

SUMMARY OF THE INVENTION

The moisture detection apparatus of the present invention addresses the aforementioned needs in the art by providing a simple standalone moisture detection device that is easily installed at critical failure potential points of a building in order to alert an owner or occupant of the building that a cladding failure has occurred, resulting in moisture penetration into the building. The moisture detection apparatus does not rely on electricity for its proper functioning and can be installed during building construction or after building completion without undue difficulty.

The moisture detection apparatus of the present invention is comprised of a casing that has a first end with a first window and a first flange extending radially outwardly from the first window, a second end, a top, a bottom, and an interior chamber, the top of the casing having an aperture. A moisture absorbent material is disposed within the interior chamber and is visible through the first window. A moisture soluble dye is disposed within the interior chamber such that the dye dissolves upon coming in contact with moisture thereby changing the color of the absorbent material. The casing is affixed within the inner space of a building between an interior wall surface and an exterior wall surface such that the first window protrudes through either the interior surface of the wall or the exterior surface of the wall and such that when moisture enters the inner space and enters the interior chamber of the casing through the aperture, the moisture contacts the dye which dissolves and changes the color of the absorbent material which color change is visible through the first window. The casing may be comprised of a first section and a second section is partially and slideably receives the first section in order to allow the casing to telescopically expand along its longitudinal axis. The second end of the casing may have a second window and a second flange extending radially outwardly from the second window such that the absorbent material is also visible through the second window and such that the second window protrudes through the surface of the wall opposite the surface through which the first window protrudes. The casing is installed below one or more openings of the building.

BRIEF DESCRIPTION OF THE DRAWINGS

Similar reference numerals refer to similar parts throughout the several views of the drawings.

DESCRIPTION OF THE PREFERRED EMBODIMENT

Figure 1:
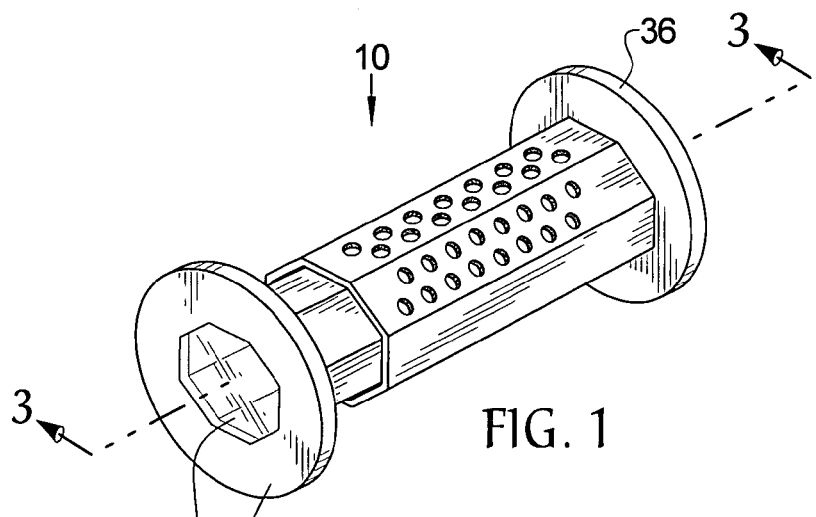
FIG. 1 is a perspective view of the moisture detection apparatus of the present invention.
Figure 2:
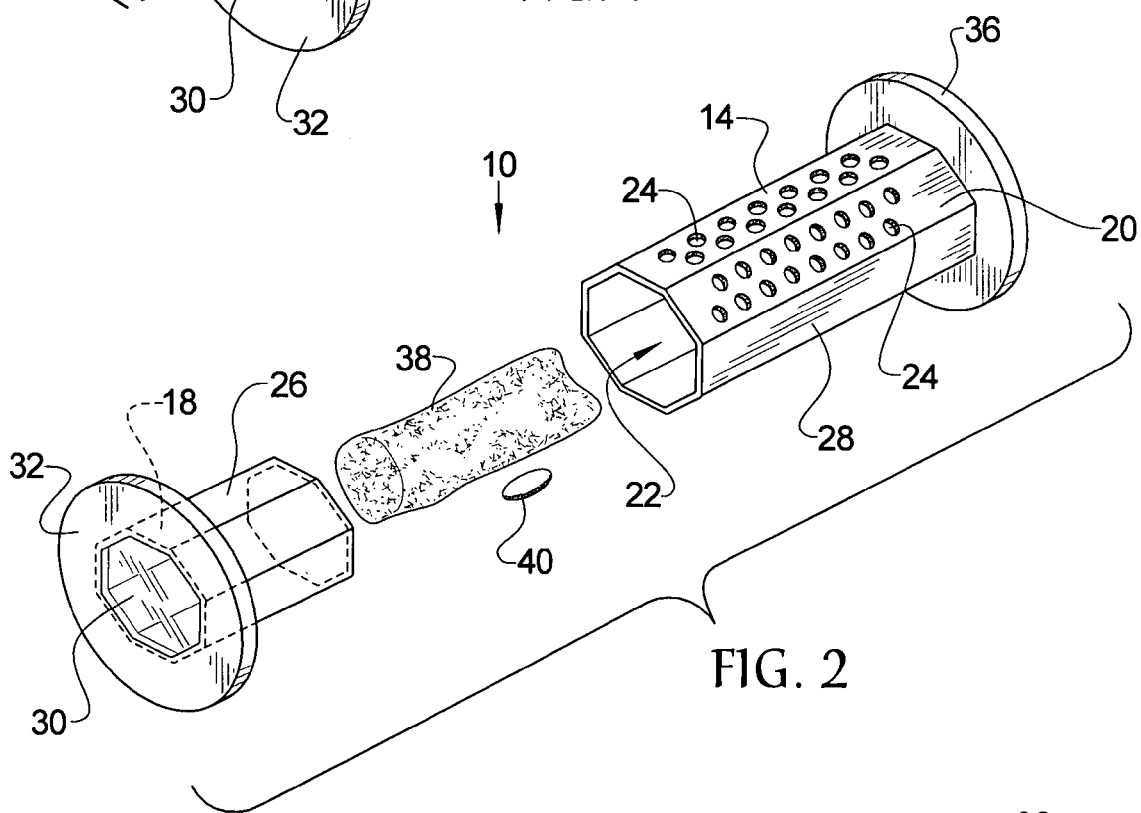
FIG. 2 is an exploded perspective view of the moisture detection apparatus.
Figure 3:
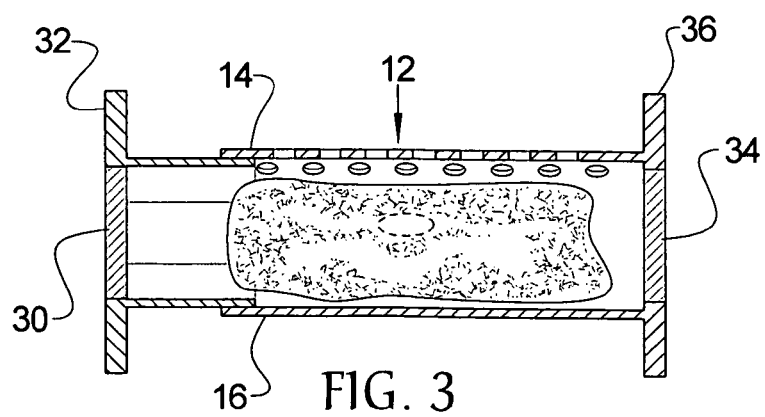
FIG. 3 is a sectional view of the moisture detection apparatus taken along line 3-3 in FIG. 1.
Figure 4:
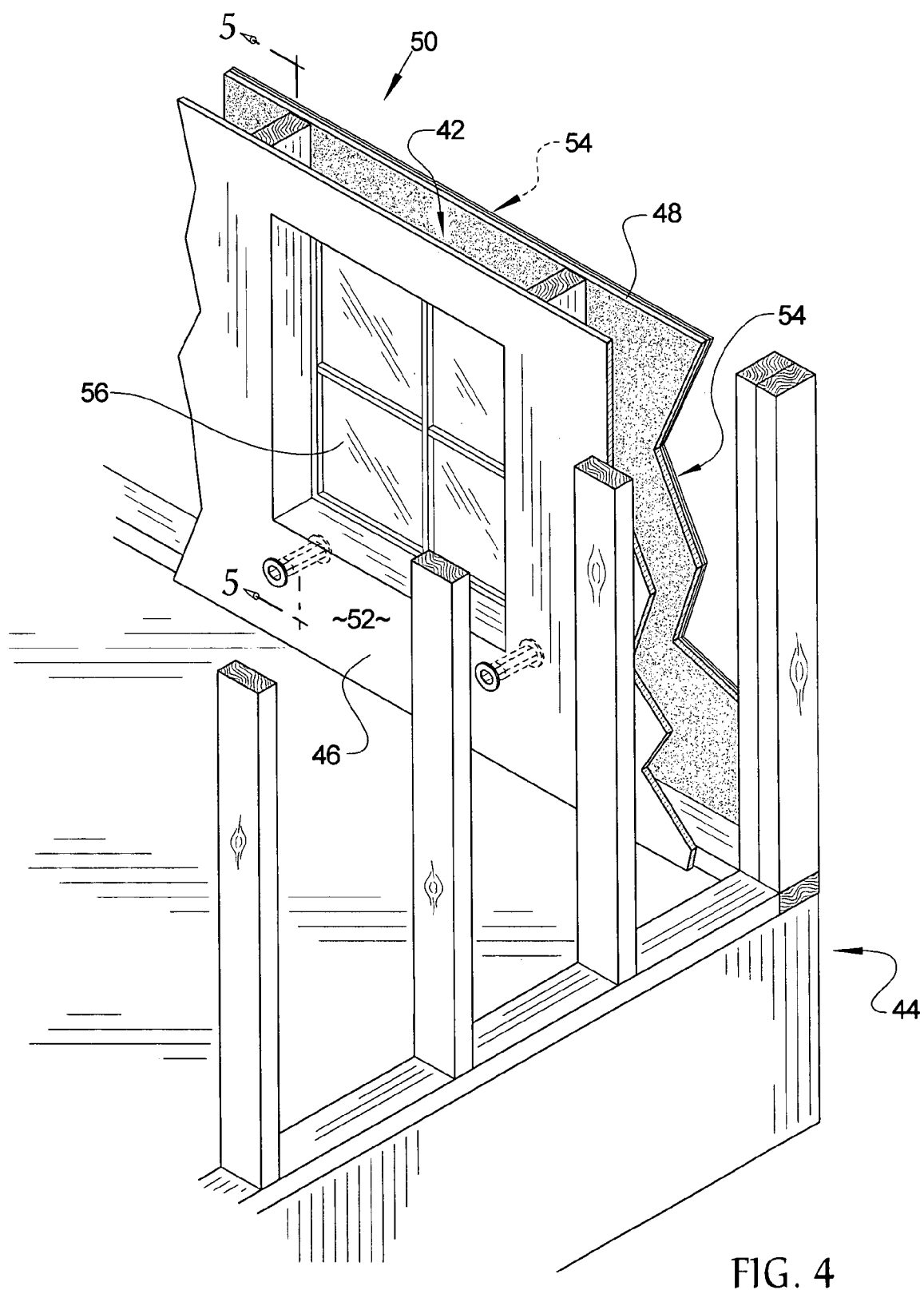
FIG. 4 is a perspective view of the moisture detection apparatus installed within an exterior wall of a building.
Figure 5:
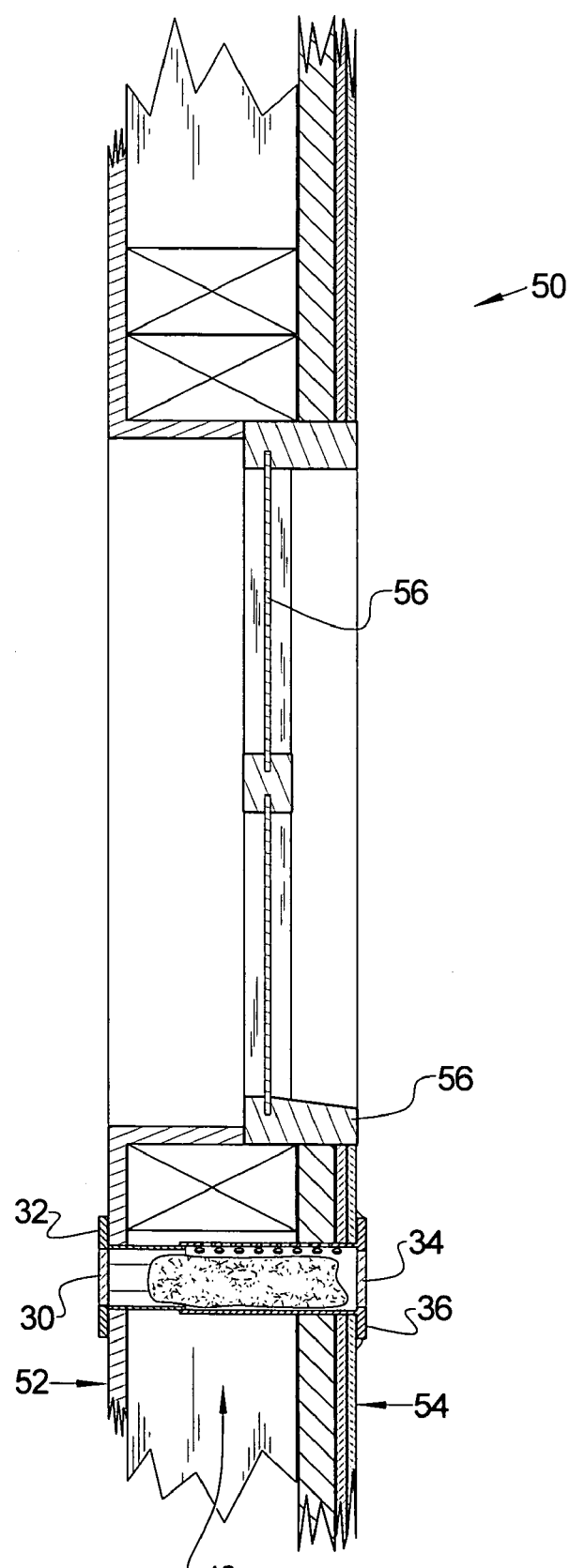
FIG. 5 is a sectional view of the moisture detection apparatus installed within the exterior wall of the building taken along line 5-5 in FIG. 4.

Referring now to the drawings, it is seen that the moisture detection apparatus of the present invention, generally denoted by reference numeral 10, is comprised of a casing 12 that has a top 14, a bottom 16, a first end 18, a second end 20, an interior chamber 22, and one or more apertures 24 located along the top 14. The casing 12 may have any desired shape such as the illustrated octagonal shape. The casing 12 may be unitary in construction, or as illustrated, may be comprised of a first section 26 and a second section 28 that partially receives the first section 26, the first section 26 capable of sliding therein in order to allow the casing 12 to be telescopingly expandable and contractable along its longitudinal axis. The cross-sectional shape of the exterior of the of the second section 28 is substantially similar to the cross-sectional shape of the interior of the first section 26 in order to facilitate the slideability of the first section 26 within the second section 28 and the two cross sections are sized so as to provide a relatively snug fit of the first section 26 within the second section 28.

A first window 30 is disposed on the first end 18 of the casing 12 and a first flange 32 extends radially outwardly from this first window 30, the first flange 32 may, but need not necessarily be monolithic with the casing 12 (or the section 26 or 28 on which the first flange 32 is located if using a telescoping casing 12). A second window 34 is disposed on the second end 20 of the casing 12 and a second flange 36 extends radially outwardly from this second window 34, the second flange 36 may, but need not necessarily be monolithic with the casing 12 (or the section 26 or 28 on which the second flange 36 is located if using a telescoping casing 12).

A moisture absorbent material 38 is disposed within the interior chamber 22 of the casing 12 and is visible through the first window 30 and the second window 34. The moisture absorbent material 38 may be any appropriate material that absorbs moisture such as cotton, a fabric, a sponge, a powder, etc. A moisture soluble dye is also disposed within the interior chamber 22 of the casing 12 such that upon contact with moisture, the dye dissolves and changes the color of the absorbent material 38, which color change is visible through the first window 30 and the second window 34. The dye may be in any form including the illustrated dye pellet 40, a powder and may be located separate from the moisture absorbent material 38 or the moisture absorbent material 38 may be impregnated with the dye in the case of the absorbent material 38 being cotton, a sponge, a fabric, etc., or may be mixed in with the moisture absorbent material 38 in the case when the moisture absorbent material 38 is a powder.

In order to use the moisture detection apparatus 10 of the present invention, the casing 12 is installed within an inner space 42 of a building 44 (which is any appropriate habitable building including a house, a duplex, an office building, an apartment, etc.,), the inner space 42 being between an interior wall section 46 and an exterior wall section 48 of the overall exterior wall 50 of the building 44. The casing 12 is positioned such that the first window 30 protrudes through either the interior surface 52 of the interior wall section 46 of the wall 50 or the exterior surface 54 of the exterior wall section 48 of the wall 50. If the casing 12 has a second window 34, the second window 34 protrudes through the opposite surface 52 or 54 of the surface through which the first window 30 protrudes so that if the first window 30 protrudes through the interior surface 52 then the second window 34 protrudes through the exterior surface 54 and vice versa. If the casing 12 only has a first window 30, then the first window 30 can protrude through either the interior surface 52 or the exterior surface 54 as desired by the building's owner (although for some openings such as dryer exhaust vent openings (not illustrated), an exterior surface 54 protrusion may be preferred). The casing 12 is telescopingly expanded as needed in order to protrude through both the interior surface 52 and the exterior surface 54 if both a first window 30 and a second window 34 are utilized. If the casing 12 is of a fixed length, then it manufactured in one of several fixed lengths if both a first window 30 and a second window 34 are used as the distance between the interior surface 52 and the exterior surface 54 is generally one of a handful of known distances depending on the width of the studs used during building 44 construction. The first flange 32 and the second flange 36 help maintain the casing 12 in its installed position. One casing 12 is placed beneath each critical point of the building 44. Such critical points tend to be at any openings 56 which include the illustrated window 56, doors, vent openings, hose bibs, light fixtures and anywhere where the cladding abuts up against a material that is different from the cladding. Oftentimes, and especially in the case of larger structures such as windows 56, two casings 12 (or more) are used, typically beneath each corner of the opening 56 as any cladding failure at such opening 56 tends to occur at the corners and even if the failure occurs medially of the corners, the water tends to run along the length of the opening's casement until it reach the opening's corner upon where the water enters and drops down into the inner space 42 of the building 44.

Once the building 44 is fully outfitted with casings 12, any cladding failure that results in moisture that penetrates into the building 44 eventually comes down to the respective casing 12 and enters the interior chamber 22 of the casing 12 through the upwardly oriented aperture 24. Once the moisture enters the interior chamber 22, the moisture comes in contact with the dye 40 which dye 40 dissolves and changes the color of the absorbent material 38. The color change of the absorbent material 38 is noted by an appropriate person associated with the building 44 and corrective action is immediately undertaken. Caught at this early stage, the damage tends to substantially less than if moisture penetration is allowed to continue for some time.

While the invention has been particularly shown and described with reference to an embodiment thereof, it will be appreciated by those skilled in the art that various changes in form and detail may be made without departing from the spirit and scope of the invention.

I claim:

1. A device for detection of moisture within a wall of a building, in combination with the building, the wall having, an opening, an interior surface and an opposing exterior surface and a inner space therebetween, the device comprising:
    a casing having a substantially flat first end, a substantially flat second end, a top, a bottom, and an interior chamber, the top having an aperture;
    a first window located on the first end of the casing;
    a moisture absorbent material disposed within the interior chamber and visible through the first window;
    a moisture soluble dye disposed within the interior chamber such that the dye dissolves upon coming in contact with moisture thereby changing the color of the absorbent material; and
    a second window disposed on the second end of the casing such that the absorbent material is visible through the second window;
    wherein the casing is affixed within the inner space of the building such that the first window protrudes through the interior surface of the wall and the second window protrudes through the exterior surface of the wall such that when moisture enters the inner space and enters the interior chamber of the casing through the aperture, the moisture contacts the dye which dissolves and changes the color of the absorbent material.

2. The device as in claim 1 wherein the casing is comprised of a first section and a second section partially disposed within the first section, the first section slideably disposed within the second section in order to allow the casing to telescopically expand along its longitudinal axis.

3. The device as in claim 1 wherein the casing is installed below the opening.

4. A device for detection of moisture within a wall of a building, in combination with the building, the wall having, an opening, an interior surface and an opposing exterior surface and a inner space therebetween, the device comprising:
    an elongate casing having a constant diameter, the casing having a substantially flat first end with a first window and a first flange extending radially outwardly from the first window and beyond the diameter of the casing, a substantially flat second end having a second window and a second flange extending radially outwardly from the second end, the second flange substantially parallel with the first flange, the second flange extending beyond the diameter of the casing, a top, a bottom, and an interior chamber, the top having an aperture;
    a moisture absorbent material disposed within the interior chamber and visible through the first window;
    a moisture soluble dye disposed within the interior chamber such that the dye dissolves color upon coming in contact with moisture thereby changing the color of the absorbent material; and
    wherein the casing is affixed within the inner space of the building such that the first window protrudes through the interior surface of the wall and the second window protrudes through the exterior surface of the wall such that when moisture enters the inner space and enters the interior chamber of the casing through the aperture, the moisture contacts the dye which dissolves and changes the color of the absorbent material.

5. The device as in claim 4 wherein the casing is comprised of a first section and a second section partially disposed within the first section, the first section slideably disposed within the second section in order to allow the casing to telescopically expand along its longitudinal axis.

6. The device as in claim 4 wherein the casing is installed below the opening.

* * * * *